US012605579B2

(12) United States Patent
Williams et al.

(10) Patent No.: US 12,605,579 B2
(45) Date of Patent: Apr. 21, 2026

(54) TEST AND DRAIN VALVE WITH INTEGRATED RELIEF VALVE

(71) Applicant: Tyco Fire Products LP, Lansdale, PA (US)

(72) Inventors: James O. Williams, Marlborough, MA (US); Joshua Motha, Tiverton, RI (US); Normand James Roy, Coventry, RI (US); Krishnaswamy Manikandan, Bangalore (IN)

(73) Assignee: Tyco Fire Producs LP, Cranston, RI (US)

( * ) Notice: Subject to any disclaimer, the term of this patent is extended or adjusted under 35 U.S.C. 154(b) by 850 days.

(21) Appl. No.: 17/921,032

(22) PCT Filed: Jul. 16, 2021

(86) PCT No.: PCT/IB2021/056471
§ 371 (c)(1),
(2) Date: Oct. 24, 2022

(87) PCT Pub. No.: WO2022/013842
PCT Pub. Date: Jan. 20, 2022

(65) Prior Publication Data
US 2023/0166145 A1 Jun. 1, 2023

Related U.S. Application Data

(60) Provisional application No. 63/053,303, filed on Jul. 17, 2020.

(51) Int. Cl.
A62C 35/68 (2006.01)
A62C 35/62 (2006.01)
(Continued)

(52) U.S. Cl.
CPC .............. *A62C 35/68* (2013.01); *A62C 35/62* (2013.01); *A62C 37/50* (2013.01); *F16K 17/048* (2013.01); *F16K 27/02* (2013.01)

(58) Field of Classification Search
CPC ......... A62C 35/58; A62C 35/60; A62C 35/62; A62C 35/68; A62C 37/50; F16K 17/048; F16K 27/02
See application file for complete search history.

(56) References Cited

U.S. PATENT DOCUMENTS

| | | | |
|---|---|---|---|
| 4,741,361 A | 5/1988 | McHugh | |
| 5,103,862 A | 4/1992 | McHugh | |
| (Continued) | | | |

FOREIGN PATENT DOCUMENTS

| | | | |
|---|---|---|---|
| JP | 2000-120898 A | 4/2000 | |
| JP | 2011-229693 A | 11/2011 | |
| (Continued) | | | |

OTHER PUBLICATIONS

Korean Intellectual Property Office as International Searching Authority; International Search Report and Written Opinion; International Application No. PCT/IB2021/056471; mailed Oct. 6, 2021; 9 pages.

*Primary Examiner* — Darren W Gorman
(74) *Attorney, Agent, or Firm* — Foley & Lardner LLP

(57) ABSTRACT

A test valve including a body, a test assembly, a relief assembly, and a drain assembly. The body includes an inlet, an outlet, an internal wall isolating the inlet from the outlet, and a drain opening, a relief opening, and a test opening defined by the internal wall and structured to facilitate fluid communication between the inlet and the outlet. The test assembly is structured to seal and unseal the test opening to selectively fluidly couple the inlet and the outlet. The relief assembly is structured to seal and unseal the relief opening to selectively fluidly couple the inlet and the outlet. The
(Continued)

drain assembly is structure to seal and unseal the drain opening to selectively fluidly couple the inlet and the outlet.

20 Claims, 4 Drawing Sheets

(51) Int. Cl.

| | | |
|---|---|---|
| *A62C 37/50* | (2006.01) | |
| *F16K 17/04* | (2006.01) | |
| *F16K 27/02* | (2006.01) | |

(56) References Cited

U.S. PATENT DOCUMENTS

| | | | | |
|---|---|---|---|---|
| 5,269,344 | A * | 12/1993 | McHugh | .................... G01F 1/28 |
| | | | | 137/557 |
| 6,186,169 | B1 | 2/2001 | McHugh | |
| 6,196,262 | B1 * | 3/2001 | Giacomini | ............. A62C 37/50 |
| | | | | 251/118 |
| 8,727,030 | B2 | 5/2014 | Feenstra | |
| 10,596,401 | B2 | 3/2020 | Ringer et al. | |
| 2011/0108290 | A1 | 5/2011 | Feenstra | |
| 2016/0195196 | A1 * | 7/2016 | Ringer | ................... A62C 35/68 |
| | | | | 169/19 |
| 2016/0375759 | A1 | 12/2016 | Vulkan et al. | |
| 2018/0147433 | A1 * | 5/2018 | Williams | ............... A62C 35/62 |
| 2018/0193681 | A1 | 7/2018 | Meyer et al. | |
| 2018/0214724 | A1 * | 8/2018 | Meyer | ................. F16K 37/0041 |
| 2019/0308046 | A1 | 10/2019 | McHugh, IV et al. | |

FOREIGN PATENT DOCUMENTS

| | | | | |
|---|---|---|---|---|
| KR | 20120016742 A | * | 2/2012 | ............. A62C 35/68 |
| WO | WO-2018/031074 A1 | | 2/2018 | |

* cited by examiner

TEST AND DRAIN VALVE WITH INTEGRATED RELIEF VALVE

CROSS-REFERENCE TO RELATED APPLICATIONS

The present application claims the benefit of priority to U.S. Provisional Application No. 63/053,303, filed Jul. 17, 2020, the disclosure of which is incorporated herein by reference in its entirety.

BACKGROUND

Sprinkler systems utilize fire suppressants (e.g., water, fire suppressant agent, etc.) to suppress fires. The fire suppressant flows from a fire suppressant source to one or more nozzles through piping.

SUMMARY

At least one aspect relates to a test valve. The test valve includes a body, a test assembly, a relief assembly, and a drain assembly. The body includes an inlet, an outlet, an internal wall isolating the inlet from the outlet, and a drain opening, a relief opening, and a test opening defined by the internal wall and structured to facilitate fluid communication between the inlet and the outlet. The test assembly can unseal the test opening to selectively fluidly couple the inlet and the outlet. The relief assembly can unseal the relief opening to selectively fluidly couple the inlet and the outlet. The drain assembly can unseal the drain opening to selectively fluidly couple the inlet and the outlet.

At least one aspect relates to a fire suppression system. The fire suppression system includes a pipe and a test valve coupled with the pipe. The test valve includes a body, a test assembly, a relief assembly, and a drain assembly. The body includes an inlet to receive a flow of fluid from the pipe, an outlet, an internal wall isolating the inlet from the outlet, and a drain opening, a relief opening, and a test opening defined by the internal wall to facilitate fluid communication between the inlet and the outlet. The test assembly can unseal the test opening to selectively fluidly couple the inlet and the outlet. The relief assembly can unseal the relief opening to selectively fluidly couple the inlet and the outlet. The drain assembly can unseal the drain opening to selectively fluidly couple the inlet and the outlet.

DETAILED DESCRIPTION

Figure 1:
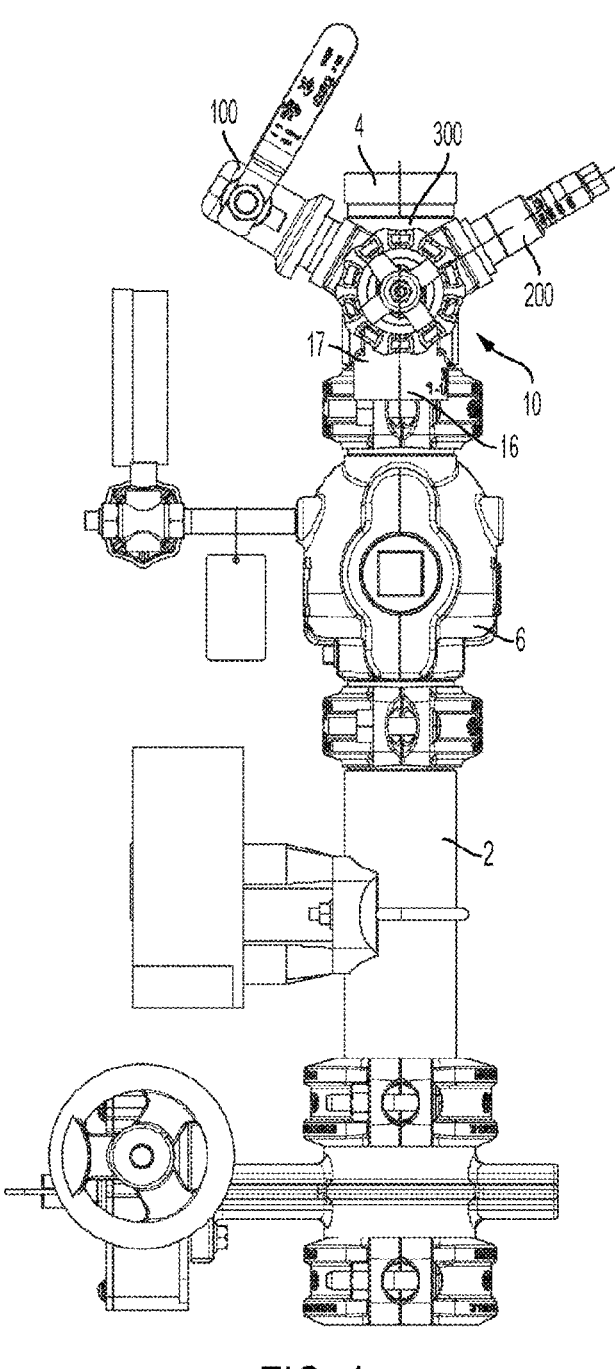
FIG. 1 is a perspective view of an example of a pipe system in a fire suppression system.

Before turning to the figures, which illustrate certain examples, it should be understood that the present disclosure is not limited to the details or methodology set forth in the description or illustrated in the figures. It should also be understood that the terminology used herein is for the purpose of description only and should not be regarded as limiting.

Fire suppression systems can include piping which facilitates transfer of fire suppressant (e.g., fire suppressant agent, water, etc.) through a space (e.g., a building, a vehicle, a kitchen, an attic, a garage, a dock etc.). The fire suppressant can subdue or prevent the spread of a fire in a hazard area. One or more detectors can sense a condition (e.g., temperature, thermal optics, smoke, etc.) in the hazard area. The detectors then send a signal (e.g., electrical, mechanical, pneumatic, etc.) to a controller which activates an actuator to facilitate the fire suppressant to flow into the piping.

A flow switch may be included within the fire suppression system for flow indication. Components for draining the fire suppression system, simulating (e.g., mechanically operating in a manner similar to) a release of fire suppression agent, and relieving pressure to limit over pressurization may be included with the flow switch. A test valve may be included within the fire suppression system to accomplish these tasks in a single component by being structured as described herein to integrate with the fire suppression system with limited trim components or other connections needed to operate as a test valve. The test valve can comprise a drain opening, a test opening, and a pressure relief opening. The test opening facilitates release of fire suppression agent at a predetermined flow rate, which can be similar to a flow rate of fire suppression agent being released through a nozzle. The pressure relief opening facilitates venting of pressure responsive to the pressure in the fire suppression system exceeding a threshold. The drain opening facilitates draining of fire suppression agent within the fire suppression system.

Referring generally to the figures, fire suppression systems described herein can include a test valve incorporated in the piping to facilitate testing, draining, and pressure venting of the fire suppression system. The test valve includes a body. The body defines a main drain. The main drain receives a drain assembly. The drain assembly includes a drain plunger. The drain plunger extends through a drain plug and a sealing ring. The drain plug selectively fluidly couples the main drain to an ambient environment. The drain assembly also includes a handle. The handle allows a user to translate the drain plug to seal or unseal the main drain and the ambient environment. The body also defines a relief opening. The relief opening receives a relief assembly. The relief assembly includes a relief plunger. The relief plunger selectively seals and unseals the relief opening from an ambient environment. The relief plunger connects with a spring. The spring couples to an adjustable cap. The adjustable cap allows a user to adjust a force required to compress the spring. The relief assembly includes a holder. The holder couples to the body and limits movement of the adjustable cap relative to the body. The body also includes a test opening. The test opening receives a test assembly. The test assembly includes a piston. The piston facilitates sealing and unsealing of the test opening. The piston is coupled with a bushing. The bushing connects with a portion of the body to limit radial movement of the test assembly relative to the test opening. The test assembly includes a die spring and a lever cap. The lever cap connects with the die spring, which is coupled with the piston, to move the piston. The body also defines an inlet opening and an outlet opening.

Figure 2:
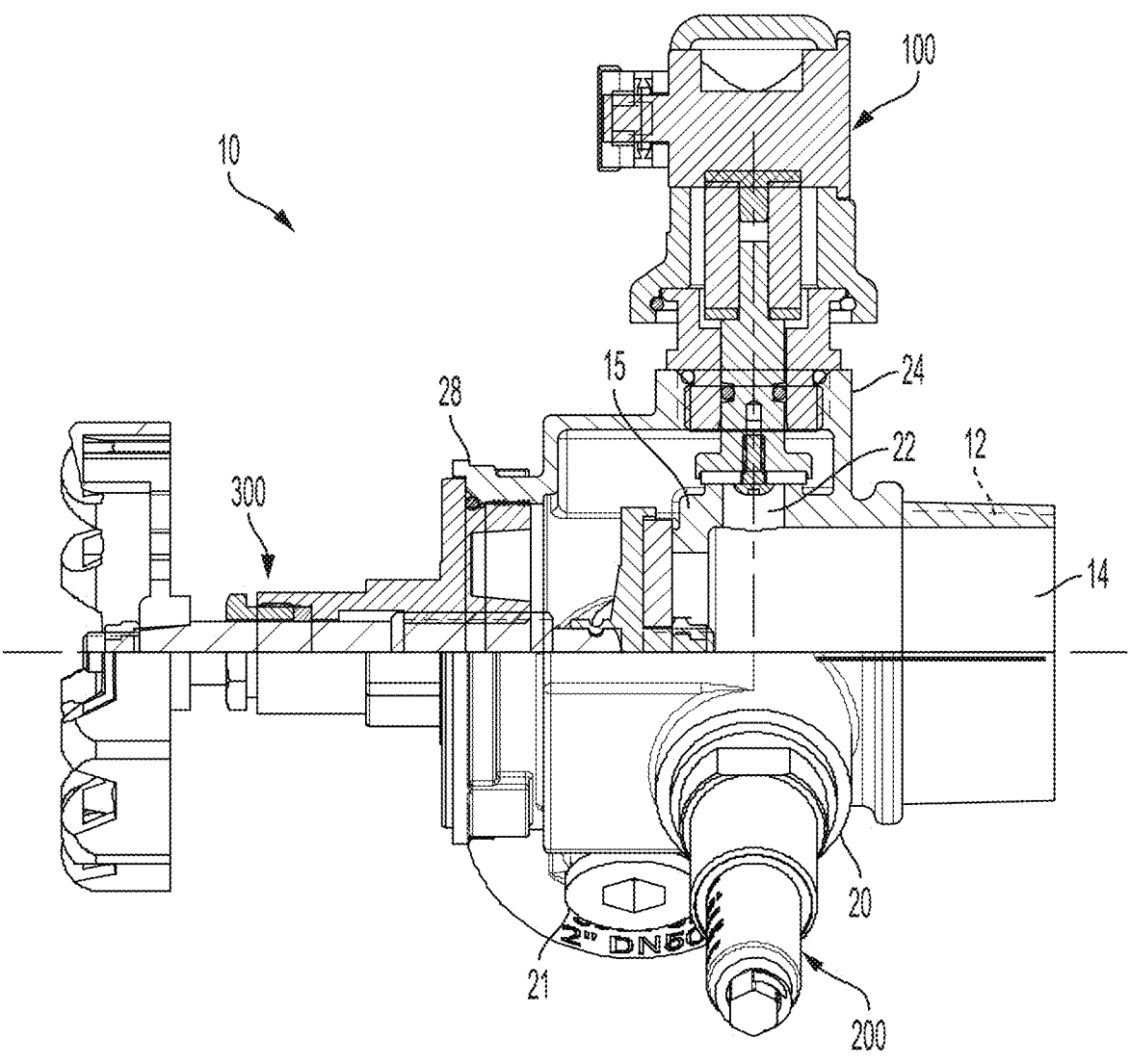
FIG. 2 is a section view of an example of a test valve.
Figure 3:
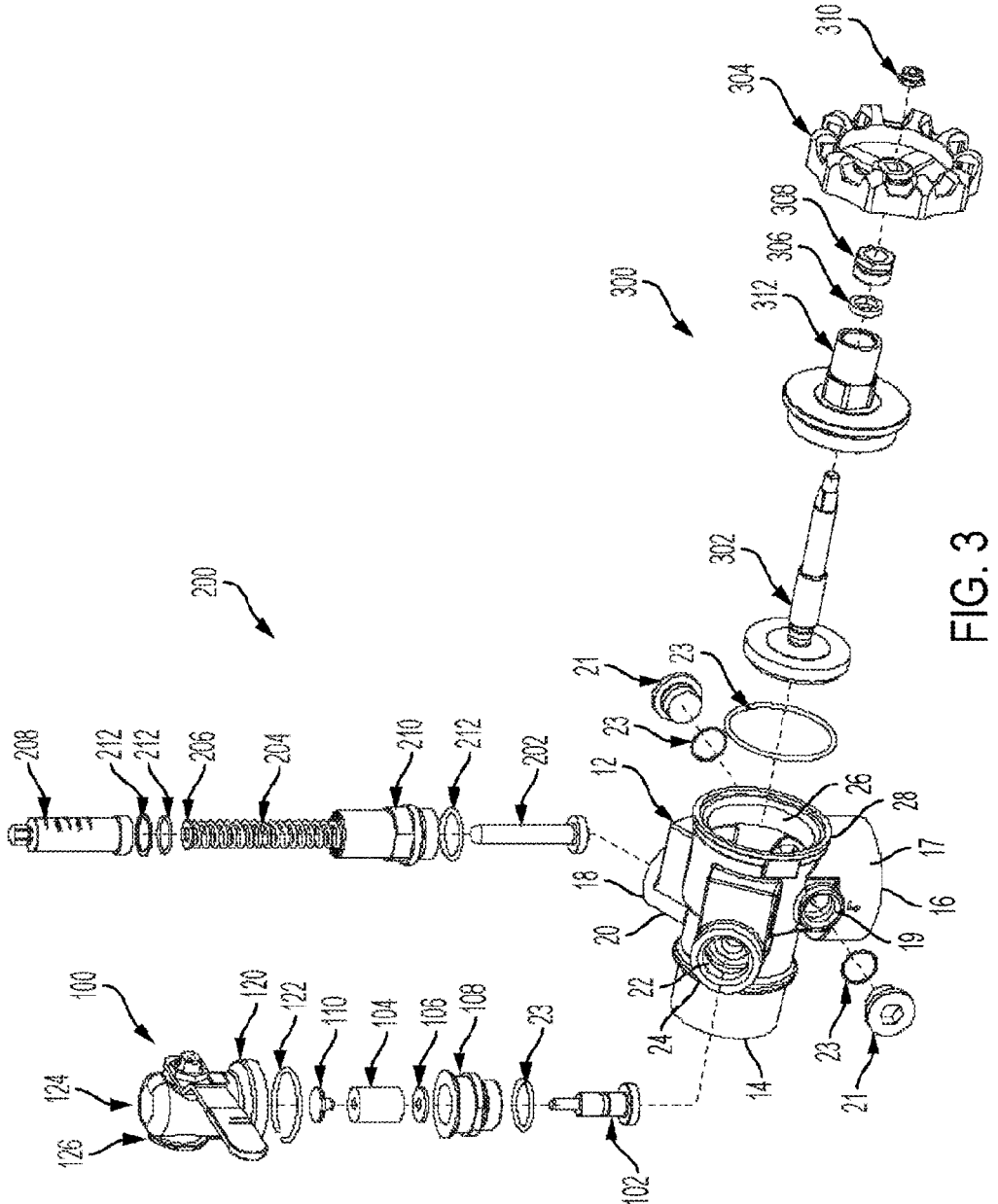
FIG. 3 is an exploded view of an example of a test valve.

FIGS. 1-3 depict an example of a test valve 10. The test valve 10 is positioned within a fire suppression system. The fire suppression system may be a wet or a dry system. The fire suppression system utilizes a fire suppression agent (e.g., water, etc.) to suppress a fire. The test valve 10 is coupled with a pipe 2 (which can be a Schedule 40 grooved pipe) that directs the fire suppression agent from a source to one or more nozzles (e.g., outlets, etc.). The pipe 2 can include or be coupled with one or more test valves 10. In some examples, one test valve 10 is directly coupled with the pipe 2. In other examples, a second test valve 10 is coupled by a conduit to the pipe 2. The pipe 2 may also include a pressure sensor, a valve, a flow control, or another component. Various connections between one or more test valves 10 and the pipe 2 (e.g., using one or more intermediary couplings, valves, or other piping or flow control components) can be implemented. For example, as depicted in FIG. 1, the test valve 10 can be connected with a tee 4 (e.g., Schedule 40 grooved tee pipe), which can connect with a check valve 6, which can connect with the pipe 2.

The test valve 10 includes a body 12. The body 12 can connect with the pipe 2 and various other components of the test valve 10 or the fire suppression system. The body 12 can form flow paths for fluids (e.g., gasses, fire suppression agent, water, etc.) within the fire suppression system. The body 12 defines an inlet opening 14 (e.g., inlet), which can connect with the pipe 2. The inlet opening 14 is defined partially through the body 12. In some examples, the body 12 includes threading positioned within the inlet opening 14 or on a portion of the body 12 external of the inlet opening 14. In other examples, the body 12 is coupled with the pipe 2 or a conduit by, for example, adhesive, friction, crimping, etc. The inlet opening 14 receives fluid from the pipe 2 or another conduit. The body 12 defines an interior wall 15. The interior wall 15 defines an end to the inlet opening 14.

The body 12 and the interior wall 15 define an outlet opening 16 (e.g., outlet). The outlet opening 16 may be positioned perpendicular to the inlet opening 14 (e.g., an axis through the inlet opening 14 is perpendicular to an axis through the outlet opening 16). The outlet opening 16 receives fluid from the inlet opening 14. The outlet opening 16 can release fluid into an ambient environment. In some examples, the outlet opening 16 is fluidly coupled with a conduit that directs the fluid to a location remote of the test valve 10. The outlet opening 16 is defined on an outlet protrusion 17. The outlet protrusion 17 extends perpendicular to the inlet opening 14. The outlet protrusion 17 and/or the outlet opening 16 may include features that facilitate coupling to an external component (e.g., a tube, a hose, etc.). In some examples, the body 12 defines sight glass openings 19. The sight glass openings 19 are defined on the outlet protrusion 17. The sight glass openings 19 can receive a sight glass 21 and/or a seal 23.

The body 12 and the interior wall 15 also define a relief opening 18. The relief opening 18 allows fluid communication between the inlet opening 14 and the outlet opening 16. The body 12 also includes a relief protrusion 20 extending outward from the body 12. The relief protrusion 20 and the relief opening 18 are aligned along an axis.

The body 12 and the interior wall 15 also define a test opening 22. The test opening 22 allows fluid communication between the inlet opening 14 and the outlet opening 16. The body 12 includes a test protrusion 24 extending outward from the body 12. The test opening 22 and the test protrusion 24 are aligned along an axis. The test protrusion 24 may include features structured to connect with components external of the body 12. The body 12 and the interior wall 15 also define a drain opening 26. The drain opening 26 allows fluid communication between the inlet opening 14 and the outlet opening 16. The body 12 includes a drain protrusion 28 extending outward from the body 12. The drain protrusion 28 and the drain opening 26 are aligned along an axis. In some examples, the drain opening 26, the drain protrusion 28, and the inlet are aligned along a similar axis, and the outlet protrusion 17, the outlet opening 16, the relief protrusion 20, the relief opening 18, the test protrusion 24, and the test opening 22 are perpendicular to the inlet opening 14. The outlet protrusion 17 and the outlet opening 16 can be located 120 degrees from the relief protrusion 20 and the relief opening 18, and the test protrusion 24 and the test opening 22.

The body 12 may include features to indicate the various openings (e.g., the test opening 22, the relief opening 18, the sight glass openings 19, the inlet opening 14, the outlet opening 16, etc.). For example, the body 12 can include indentations that spell out each opening (e.g., "test", "relief", etc.). The features can also indicate manufacturing company, tolerances, direction of flow, pressure, and/or dimensions.

The test valve 10 can include or be coupled with a test assembly 100. The test assembly 100 can connect with the test opening 22 and the test protrusion 24 of the body 12. The test assembly 100 allows a user to selectively seal and unseal the test opening 22 by access through the test protrusion 24, such as by moving test piston 102 relative to test opening 22 (e.g., between unactuated and actuated positions) to selectively block a flow path between the inlet opening 14 and outlet opening 16 as described herein. The test assembly 100 can be removably or fixedly coupled with the test protrusion 24.

The test assembly 100 includes a test piston 102. The test piston 102 extends into the body 12 by the test protrusion 24 to selectively seal the inlet opening 14 from fluid communication with the outlet opening 16 by the test opening 22. The test piston 102 may have a larger base (e.g., side to be received in the test opening 22) than a top (e.g., side opposite the base). The base connects with the interior wall 15. The base may also include a sealing member (e.g., a deforming member, an O-ring, etc.) to create a fluid seal on the test opening 22. The sealing member may be tapered to extend partially into the test opening 22 to form a stronger seal. The top of the test piston 102 is coupled with a test die spring 104. The test die spring 104 and the test piston 102 may be coupled by, for example, crimping or adhesive. The test piston 102 is received by an opening defined through the test die spring 104. The test die spring 104 is spaced from the test piston 102 by a test washer 106. The test die spring 104 acts as an intermediate body during actuation of the test assembly 100 to receive forces and transfer the forces to the test piston 102. The test die spring 104 also couples to a test button 110. A portion of the test button 110 is received by the opening on an opposite side of the test die spring 104 than the test piston 102. The test die spring 104 may be a spring or may be a solid body acting as a spring. The test die spring 104 and the test piston 102 also connect with a test bushing 108. The test bushing 108 defines an opening extending through that receives at least a portion of the test die spring 104, the test washer 106, and/or the test piston 102. The test bushing 108 limits lateral movement of the test piston 102 and the test die spring 104. The test bushing 108 facilitates coupling of the test assembly 100 to the body 12. The test bushing 108 extends partially into and connects with features on the test protrusion 24.

The test assembly 100 can include a test cap 120. The test cap 120 functions as an connect component of the test assembly 100 to allow a user to actuate the test assembly 100. The test cap 120 is coupled with a lip of the test bushing 108. The test cap 120 and the test bushing 108 may be couple by an adhesive. A retaining ring 122 may be positioned between the test cap 120 and the test bushing 108. The test cap 120 includes a stationary cover 124. The stationary cover 124 defines an anchor for the test cap 120. The stationary cover 124 also couples to the test bushing 108. The stationary cover 124 defines an opening through which a rotational member 126 extends. The rotational member 126 is rotationally coupled with the stationary cover 124, such that the rotational member 126 may rotate freely within the stationary cover 124. The rotational member 126 defines an attachment point for a lever. The lever defines an opening through which the attachment point of the rotational member 126 extends, fixedly coupling the lever and the rotational member 126.

The test valve 10 can include a relief assembly 200. The relief assembly 200 can connect with the relief opening 18 and the relief protrusion 20. The relief assembly 200 selectively seals the inlet opening 14 from the outlet opening 16 by sealing and unsealing the relief opening 18. The relief assembly 200 can actuate in response to a pressure within the pipe and the inlet opening 14. The relief assembly 200 automatically unseals the relief opening 18 and releases pressure in the inlet opening 14 and the pipe in response to a threshold pressure within the inlet opening 14 and the pipe being reached.

The relief assembly 200 includes a relief plunger 202. The relief plunger 202 extends through the relief protrusion 20 and connects with the relief opening 18. The relief plunger 202 defines a sealing surface at a bottom, which may include a seal or a deforming member, to selectively fluidly couple the inlet opening 14 to the outlet opening 16 by the relief opening 18. The sealing surface can have a larger diameter than a top of the relief plunger 202 and the relief opening 18. The sealing surface connects with the interior wall 15. The sealing surface may be tapered to extend partially into the relief opening 18 to form a stronger seal. The top of the relief plunger 202 receives a relief spring 204. The relief spring 204 can have a diameter larger than the top of the relief plunger 202 and smaller than the sealing surface at the bottom of the relief plunger 202, such that the relief spring 204 rests on the sealing surface. The relief spring 204 extends past the top of the relief plunger 202 and couples to a relief washer 206.

The relief washer 206 spaces the relief spring 204 from a relief adjustable cap 208. The relief washer 206 also forms a flat surface the relief spring 204 and the relief adjustable cap 208 can connect with. A portion of the relief spring 204 and the relief washer 206 extend into an opening defined in a bottom of the relief adjustable cap 208 and connect with an adjustable portion within the relief adjustable cap 208. The adjustable portion can be a surface which can be moved closer or further from the bottom of the relief adjustable cap 208. The adjustments may be made by an adjusting knob on a top of the relief adjustable cap 208. As the user turns the adjusting knob, the distance between the adjustable portion and the bottom increases or decreases.

The bottom of the relief adjustable cap 208 is received by a relief bracket 210. The relief bracket 210 defines an opening extending through that receives the relief spring 204 and the relief plunger 202. The relief bracket 210 includes an indent surrounding the opening at a top that connects with the bottom of the relief adjustable cap 208 to limit lateral movement of the relief adjustable cap 208 and limit further movement of the relief adjustable cap 208 away from or into the body 12.

The relief adjustable cap 208 and the relief bracket 210 may be coupled by adhesive. A washer and/or a seal may be disposed between the relief adjustable cap 208 and the relief bracket 210. The relief bracket 210 connects with the relief protrusion 20 on the body 12. A portion of the relief bracket 210 can extend into the relief protrusion 20 or a portion of the relief protrusion 20 can be received by the relief bracket 210. The relief bracket 210 and the relief protrusion 20 may be coupled by adhesive. A relief seal 212 may be provided between the relief bracket 210 and the relief protrusion 20 to form a fluid seal. The relief adjustable cap 208 can be adjusted to change a distance from a surface of the relief adjustable cap 208 to a bottom of the relief plunger 202 to change a compressed length of the relief spring 204 (e.g., to adjust a spring force of the relief spring 204).

The test valve 10 can include a drain assembly 300. The drain assembly 300 connects with the drain opening 26 and the drain protrusion 28. The drain assembly 300 selectively seals the inlet opening 14 from the outlet opening 16 by sealing and unsealing the drain opening 26. The drain assembly 300 actuates in response to a force imparted by a user. The drain assembly 300 unseals the drain opening 26 and releases fluid in the inlet opening 14 and the pipe in response to being connected with the drain assembly 300.

The drain assembly 300 includes a drain plunger 302. The drain plunger 302 extends through the drain protrusion 28 to connect with the interior wall 15. The drain plunger 302 includes a bottom that may include a sealing surface (e.g., an O-ring, a deforming surface, rubber, etc.). The sealing surface is sized to cover the drain opening 26 and limit fluid flow through the drain opening 26 while the drain plunger 302 connects with the interior wall 15. The sealing surface may be tapered to extend partially into the drain opening 26 to form a stronger seal. A top of the drain plunger 302 is coupled with a drain handle 304. The drain handle 304 and the drain plunger 302 may be spaced by a drain seal 306 and/or a drain nut 308. The drain handle 304 is removably coupled with the top of the drain plunger 302 by a drain fastener 310 (e.g., a screw, a nut, a lock-nut, etc.). The drain plunger 302, the drain seal 306, and the drain nut 308 are received by a drain holder 312, specifically an opening defined through the drain holder 312. The drain holder 312 includes a bottom that has a diameter larger than a top. A portion of the bottom may be larger than the drain protrusion 28. The drain holder 312 couples to the drain protrusion 28 of the body 12 by, for example, adhesive. A portion of the drain holder 312 is received by the drain protrusion 28 and a second portion of the drain holder 312 is larger than the drain protrusion 28 to connect with the drain protrusion 28. A drain seal 314 may be provided between the drain holder 312 and the body 12 to form a fluid seal.

FIG. 2 depicts an example of the test valve 10 in an assembled state. While assembled, the test assembly 100 is partially received by the test protrusion 24 and connects with the interior wall 15 surrounding the test opening 22. The test piston 102 is in an extended position, such that fluid is limited from flowing through the test opening 22 from the inlet opening 14 to the outlet opening 16. A user may provide a force to the test lever to actuate the test assembly 100. During actuation, the test lever rotates the rotational member 126. Rotation of the rotational member 126 allows movement of the test button 110, the test die spring 104, and the test piston 102. The test piston 102 is able to lift from the test opening 22 and fluid flow from the inlet opening 14 to the outlet opening 16 through the test opening 22 is allowed. The flow rate of fluid flow through the test opening 22 may be a predetermined flow rate. The predetermined flow rate may be, for example, the flow rate of fluid leaving the pipe to be dispersed by a nozzle during activation of the fire suppression system. The test piston 102 is a predetermined distance from the interior wall 15 to facilitate the predetermined flow rate. The distance may be varied to vary the predetermined flow rate.

While assembled, the relief assembly 200 can be partially received by the relief protrusion 20 and connects with the interior wall 15 surrounding the relief opening 18. The relief plunger 202 connects with the interior wall 15 to limit fluid flow from the inlet opening 14 to the outlet opening 16 by the relief opening 18. The adjustable cap is adjusted to change the distance from the top of the relief spring 204 to the bottom of the relief spring 204, which changes the force exerted by the spring on the relief plunger 202. The adjustable cap can be adjusted to a predetermined amount, the amount being representative of a pressure within the inlet opening 14. In the event that the pressure in the inlet opening 14 exceeds the predetermined amount of pressure the adjustable cap is adjusted for, the pressure will exert a force on the bottom of the relief plunger 202. The force by the pressure will initially be greater than the force exerted by the relief spring 204 on the relief plunger 202 causing the relief plunger 202 to be lifted from the interior wall 15. Pressure is vented from the inlet opening 14 to the outlet opening 16 by the relief opening 18 when the relief plunger 202 is lifted. Once the pressure in the inlet opening 14 falls below the predetermined amount of pressure, the relief spring 204 will exert a greater force, thus causing the relief plunger 202 to seal fluid communication between the inlet opening 14 and the outlet opening 16 by the relief opening 18. As described above, the adjustable cap can be adjusted during implementation of the test valve 10 if a change of the predetermined amount of pressure is required.

While assembled, the drain assembly 300 is partially received by the drain protrusion 28 and connects with the interior wall 15 surrounding the drain opening 26. The drain plunger 302, in an extended position, connects with the interior wall 15 to limit fluid flow from the inlet opening 14 to the outlet opening 16 by the drain opening 26. The user may connect with the drain handle 304 to actuate the drain plunger 302 from the extended position to a retracted position. A force is exerted on the drain handle 304 by the user to rotate the drain handle 304. Rotating the drain handle 304 rotates the drain plunger 302. Rotation of the drain plunger 302 causes movement of the drain plunger 302 away from the interior wall 15, which allows fluid communication between the inlet opening 14 and the outlet opening 16 by the drain opening 26. The fluid flow through the drain opening 26 may be used to empty the pipe or the inlet opening 14, therefore a maximum flow rate for the size of the drain opening 26 is beneficial.

Figure 4:
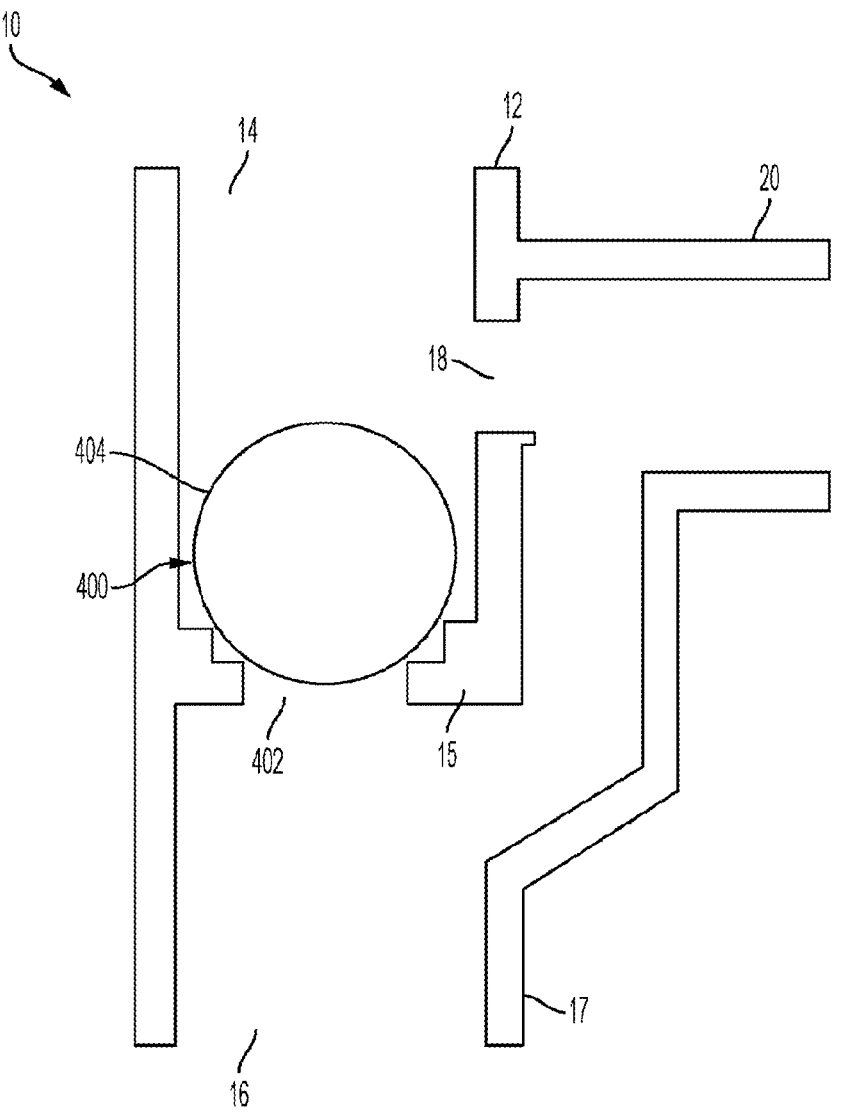
FIG. 4 is an illustration of an example of a test valve.

Referring to FIG. 4, an example of a ball valve 400 is depicted. The ball valve 400 may be included in the test valve 10. The ball valve 400 may be included in place of the test assembly 100 and/or the drain assembly 300. The ball valve 400 may also be included alongside the test assembly 100 and/or the drain assembly 300. The ball valve 400 drains fluid from the test valve 10 in response to an actuation from a user. The ball valve 400 may have a first position to drain fluid at a specific rate, a second position to drain fluid at an uninhibited rate from the test valve 10, and a third position to limit flow. The ball valve 400 connects with the inlet opening 14 and the outlet opening 16 of the body 12. The ball valve 400 may also connect with the interior wall near the test opening and/or the drain opening. Further, the test opening and the drain opening may be defined by a combined opening 402.

The ball valve 400 includes a ball 404. The ball 404 is positioned within the inlet opening 14 and connects with the interior wall. The ball 404 is positioned on the combined opening 402. The ball 404 may define an opening extending through. The opening is positioned to allow flow of fluid from the inlet opening to the outlet opening by the combined opening 402. The ball 404 may be rotatable and moveable within the inlet opening. A handle or a lever may be coupled with the ball 404 and extend out of the body 12 to allow user connect with the ball valve 400. The handle has a first position in which the ball 404 connects with the interior wall to limit flow of fluid from the inlet opening to the outlet opening by the combined opening. The handle can be moved to a second position. In the second position the opening in the ball 404 allows flow of fluid from the inlet opening to the outlet opening by the combined opening at a specific flow rate. The specific flow rate may be a similar flow rate to fluid leaving by a nozzle. The handle can be moved to a third position. In the third position the ball 404 unseats from the interior wall and allows uninhibited flow from the inlet opening to the outlet opening by the combined opening.

As utilized herein, the terms "approximately," "about," "substantially", and similar terms are intended to include any given ranges or numbers +/−10%. These terms include insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A test valve, comprising:
a body comprising:
    an inlet;
    an outlet;
    an interior wall isolating the inlet from the outlet; and
    a drain opening, a relief opening, and a test opening
      each defined by the interior wall to facilitate fluid
      communication between the inlet and the outlet;
a test assembly having an unactuated position to seal the
    test opening to block the inlet from the outlet and an
    actuated position to unseal the test opening to selec-
    tively fluidly couple the inlet with the outlet;
a relief assembly to seal and unseal the relief opening to
    selectively fluidly couple the inlet and the outlet; and
a drain assembly to seal and unseal the drain opening to
    selectively fluidly couple the inlet and the outlet.

2. The test valve of claim 1, comprising:
the test assembly comprises a piston, a spring coupled
    with the piston, a washer to space the spring from the
    piston, and a handle connected with the spring by a
    button, the button is coupled with the spring on an
    opposite side than the piston is coupled.

3. The test valve of claim 1, comprising:
the test assembly comprises a piston, a spring coupled
    with the piston, a washer to space the spring from the
    piston, and a handle connected with the spring by a
    button, the button is coupled with the spring on an
    opposite side than the piston is coupled, the handle
    translates the spring and the piston towards and away
    from the interior wall.

4. The test valve of claim 1, comprising:
the test assembly comprises a piston, a spring coupled
    with the piston, a washer to space the spring from the
    piston, and a handle connected with the spring by a
    button, the button is coupled with the spring on an
    opposite side than the piston is coupled, the handle
    translates the spring and the piston towards and away
    from the interior wall, in the actuated position of the
    test assembly, the piston is distanced from the interior
    wall, unsealing the test opening and allowing flow of
    fluid at a flow rate from the inlet to the outlet through
    the test opening, the flow rate is representative of a flow
    rate of release of fluid through a nozzle.

5. The test valve of claim 1, comprising:
in the unactuated position of the test assembly, the test
    assembly contacts the interior wall to seal the test
    opening and limit flow of fluid from the inlet to the
    outlet through the test opening.

6. The test valve of claim 1, comprising:
the relief assembly comprises a plunger with a top having
    a smaller diameter than a bottom, a spring received by
    the top and connected with the bottom of the plunger,
    and an adjustable cap to receive a portion of the spring
    and having a surface the spring connects with such that
    adjustment of the adjustable cap changes a distance
    from the surface of the adjustable cap to the bottom of
    the plunger to change a compressed length of the
    spring.

7. The test valve of claim 1, comprising:
the relief assembly comprises a plunger with a top having
    a smaller diameter than a bottom, a spring received by
    the top and connected with the bottom of the plunger,
    and an adjustable cap to receive a portion of the spring
    and having a surface the spring connects with such that
    adjustment of the adjustable cap changes a distance
    from the surface of the adjustable cap to the bottom of the plunger to change a compressed length of the
    spring, the bottom of the plunger is sized larger than the
    relief opening to facilitate sealing of the relief opening.

8. The test valve of claim 1, comprising:
the relief assembly comprises a plunger with a top having
    a smaller diameter than a bottom, a spring received by
    the top and connected with the bottom of the plunger,
    and an adjustable cap to receive a portion of the spring
    and having a surface the spring connects with such that
    adjustment of the adjustable cap changes a distance
    from the surface of the adjustable cap to the bottom of
    the plunger to change a compressed length of the
    spring, the bottom of the plunger is sized larger than the
    relief opening to facilitate sealing of the relief opening,
    the spring exerts a spring force on the bottom of the
    plunger and a pressure within the inlet exerts a pressure
    force on the bottom of the plunger, a larger spring force
    than pressure force seals the relief opening and a larger
    pressure force than spring force allows pressure to vent
    from the inlet to the outlet by the relief opening.

9. The test valve of claim 1, comprising:
the relief assembly comprises a plunger with a top having
    a smaller diameter than a bottom, a spring received by
    the top and connected with the bottom of the plunger,
    and an adjustable cap to receive a portion of the spring
    and having a surface the spring connects with such that
    adjustment of the adjustable cap changes a distance
    from the surface of the adjustable cap to the bottom of
    the plunger to change a compressed length of the
    spring, the bottom of the plunger is sized larger than the
    relief opening to facilitate sealing of the relief opening,
    the spring exerts a spring force on the bottom of the
    plunger and a pressure within the inlet exerts a pressure
    force on the bottom of the plunger, a larger spring force
    than pressure force seals the relief opening and a larger
    pressure force than spring force allows pressure to vent
    from the inlet to the outlet by the relief opening, the
    spring force is increased or decreased by adjusting the
    adjustable cap.

10. The test valve of claim 1, comprising:
the drain assembly comprises a plunger having a bottom
    and a top, the bottom sized larger than the top, a nut
    coupled with the top of the plunger, and a handle
    coupled with the nut and the top of the plunger.

11. The test valve of claim 1, comprising:
the drain assembly comprises a plunger having a bottom
    and a top, the bottom sized larger than the top, a nut
    coupled with the top of the plunger, and a handle
    coupled with the nut and the top of the plunger, the
    bottom of the plunger is sized to be larger than the drain
    opening to limit fluid flow between the inlet and the
    outlet through the drain opening when the plunger
    connects with the interior wall.

12. The test valve of claim 1, comprising:
the drain assembly comprises a plunger having a bottom
    and a top, the bottom sized larger than the top, a nut
    coupled with the top of the plunger, and a handle
    coupled with the nut and the top of the plunger, the
    bottom of the plunger is sized to be larger than the drain
    opening to limit fluid flow between the inlet and the
    outlet through the drain opening when the plunger
    connects with the interior wall, the plunger is moved
    relative to the interior wall in response to rotation of the
    handle.

13. The test valve of claim 1, comprising:
the drain assembly comprises a plunger having a bottom
    and a top, the bottom sized larger than the top, a nut coupled with the top of the plunger, and a handle coupled with the nut and the top of the plunger, the bottom of the plunger is sized to be larger than the drain opening to limit fluid flow between the inlet and the outlet through the drain opening when the plunger connects with the interior wall, the plunger is moved relative to the interior wall in response to rotation of the handle, in the actuated position, the plunger is distanced from the interior wall, unsealing the drain opening and allowing fluid to flow from the inlet to the outlet through the drain opening and in the unactuated position, the plunger connects with the interior wall to seal the drain opening and limit fluid flow from the inlet to the outlet through the drain opening.

14. The test valve of claim 1, comprising:
the test assembly and the drain assembly comprise a ball valve.

15. The test valve of claim 1, comprising:
a ball valve, the ball valve has a first position limiting fluid flow, a second position associated with the test assembly and allowing a specific fluid flow, and a third position associated with the drain assembly and allowing an uninhibited fluid flow from the inlet to the outlet.

16. A fire suppression system comprising:
a pipe; and
a test valve coupled with the pipe, comprising:
   a body comprising an inlet, an outlet, an interior wall separating the inlet from the outlet, and at least one of a drain opening, a relief opening, and a test opening each defined by the interior wall to facilitate fluid communication between the inlet and the outlet;
   a test assembly having an unactuated position to seal the test opening to block the inlet from the outlet and an actuated position to unseal the test opening to selectively fluidly couple the inlet and the outlet;
   a relief assembly to seal and unseal the relief opening to selectively fluidly couple the inlet and the outlet; and
   a drain assembly to seal and unseal the drain opening to selectively fluidly couple the inlet and the outlet.

17. The fire suppression system of claim 16, comprising:
the test assembly comprises a piston, a spring coupled with a top end of the piston; and
a washer to space the spring from the piston, and a handle connected with the spring by a button, the button is coupled with the spring on an opposite side than the piston is coupled, the piston defining the actuated position in which the piston is distanced from the interior wall, unsealing the test opening and allowing flow of fluid at a flow rate from the pipe to the outlet through the test opening, the flow rate is representative of a flow rate of release of fluid through a nozzle, and the unactuated position in which a bottom of the piston connects with the interior wall to seal the test opening and limit flow of fluid from the pipe to the outlet through the test opening, wherein the bottom of the piston is sized larger than the test opening.

18. The fire suppression system of claim 16, comprising:
the relief assembly comprises a plunger with a top having a smaller diameter than a bottom, a spring received by the top and connected with the bottom of the plunger, and an adjustable cap to receive a portion of the spring and having an adjustable surface connected with the spring, the adjustable cap to change a distance from the adjustable surface of the adjustable cap to the bottom of the plunger to change a compressed length of the spring, the spring exerts a spring force on the bottom of the plunger and a pressure within the pipe exerts a pressure force on the bottom of the plunger, a larger spring force than pressure force seals the relief opening and a larger pressure force than spring force allows pressure to vent from the pipe to the outlet by the relief opening, the spring force is increased or decreased by adjusting the adjustable cap.

19. The fire suppression system of claim 16, comprising:
the drain assembly comprises a plunger having a bottom and a top, the bottom sized larger than the top, a nut coupled with the top of the plunger, and a handle coupled with the nut and the top of the plunger, the plunger defining the actuated position in which the plunger is distanced from the interior wall, unsealing the drain opening and allowing fluid to flow from the pipe to the outlet through the drain opening, and the unactuated position in which the plunger connects with the interior wall to seal the drain opening and limit fluid flow from the pipe to the outlet through the drain opening.

20. The fire suppression system of claim 16, comprising:
wherein the drain assembly and the test assembly comprise a ball valve having a first position limiting fluid flow, a second position associated with the test assembly and allowing a specific fluid flow, and a third position associated with the drain assembly and allowing an uninhibited fluid flow from the inlet to the outlet.

\* \* \* \* \*